(12) United States Patent
Caulkins

(10) Patent No.: US 6,181,630 B1
(45) Date of Patent: Jan. 30, 2001

(54) METHOD OF STABILIZING DATA STORED IN VOLATILE MEMORY

(75) Inventor: Jason Robert Caulkins, Redding, CA (US)

(73) Assignee: Genatek, Inc., Redding, CA (US)

( * ) Notice: Under 35 U.S.C. 154(b), the term of this patent shall be extended for 0 days.

(21) Appl. No.: 09/499,702

(22) Filed: Feb. 7, 2000

Related U.S. Application Data

(60) Provisional application No. 60/121,306, filed on Feb. 23, 1999.

(51) Int. Cl.[7] .................................................. G11C 7/00
(52) U.S. Cl. ........................ 365/228; 365/183; 365/185.08
(58) Field of Search ........................... 365/185.08, 183, 365/228

(56) References Cited

U.S. PATENT DOCUMENTS 3,916,390 * 10/1975 Chang et al. ...................... 711/183
4,327,410 * 4/1982 Patel et al. ........................ 711/162
4,525,800 * 7/1985 Hamerla ............................. 714/6

* cited by examiner

Primary Examiner—David Nelms
Assistant Examiner—Gene N. Auduong

(57) ABSTRACT

A system for preventing data loss when volatile memory is used to store data either internal or external to a host computer. In the preferred embodiment, the system provides uninterrupted power to the volatile memory and to a non-volatile storage device such as a magnetic disk drive or other non-volatile memory. Upon loss of commercial power, host computer shut down, or manual initiation, the data stored in the volatile memory will be automatically backed-up to the non-volatile storage device via a high bandwidth data path. Under normal conditions, data stored in volatile memory are accessible by the host computer using a high bandwidth data path.

1 Claim, 2 Drawing Sheets

METHOD OF STABILIZING DATA STORED IN VOLATILE MEMORY

This application claims the benefit of U.S. Provisional No. 60/121,306 filed Feb. 23, 1999.

BACKGROUND OF THE INVENTION

There are two basic classifications of the media on which digital data are stored: Volatile and non-volatile. Data stored in volatile memory are lost when power is removed, where data stored in non-volatile memory are retained when power is removed. Data intended for high-speed short-term access is typically stored in volatile memory (cache or random access memory). Data intended for long term future access is typically stored in non-volatile memory (magnetic disks, or other storage media).

Volatile memory currently has faster access times and higher data transfer rates than non-volatile memory. This makes it an appealing alternative for systems requiring very high-speed access to data typically stored in long term, non-volatile storage devices.

Using volatile memory for long-term data storage has inherent risks, due to the loss of data when the power to the system is removed. The methods and systems described herein greatly reduce the risk of data loss, by providing a redundant power supply and back-up process, which ensure the data remain even more stable than data stored on the common magnetic disk drive.

In order to take advantage of the higher bandwidth of volatile memory, a high-speed data path is required between the host computer and the volatile memory storage device. For volatile memory storage devices located internal to the host computer, the computer expansion bus may be used to transfer data. For volatile memory storage devices located external to the host computer, a standard high-speed peripheral bus may be used to transfer data.

BRIEF SUMMARY

The proposed system allows volatile memory to be reliably used for long-term, high-speed data storage by the following four methods:

1. Provide external commercial power to the volatile memory storage device to maintain the data.
2. Provide a battery backup system with switching logic to supply uninterrupted power to the volatile memory and to a local or remote non-volatile storage device in the event of commercial power loss.
3. Provide long-term data retention by supporting a back-up and restore process to a local or remote non-volatile storage device.
4. Provide high-speed data paths for moving information between the host computer, the volatile memory, and the non-volatile data storage device.

DETAILED DESCRIPTION

Figure 1:
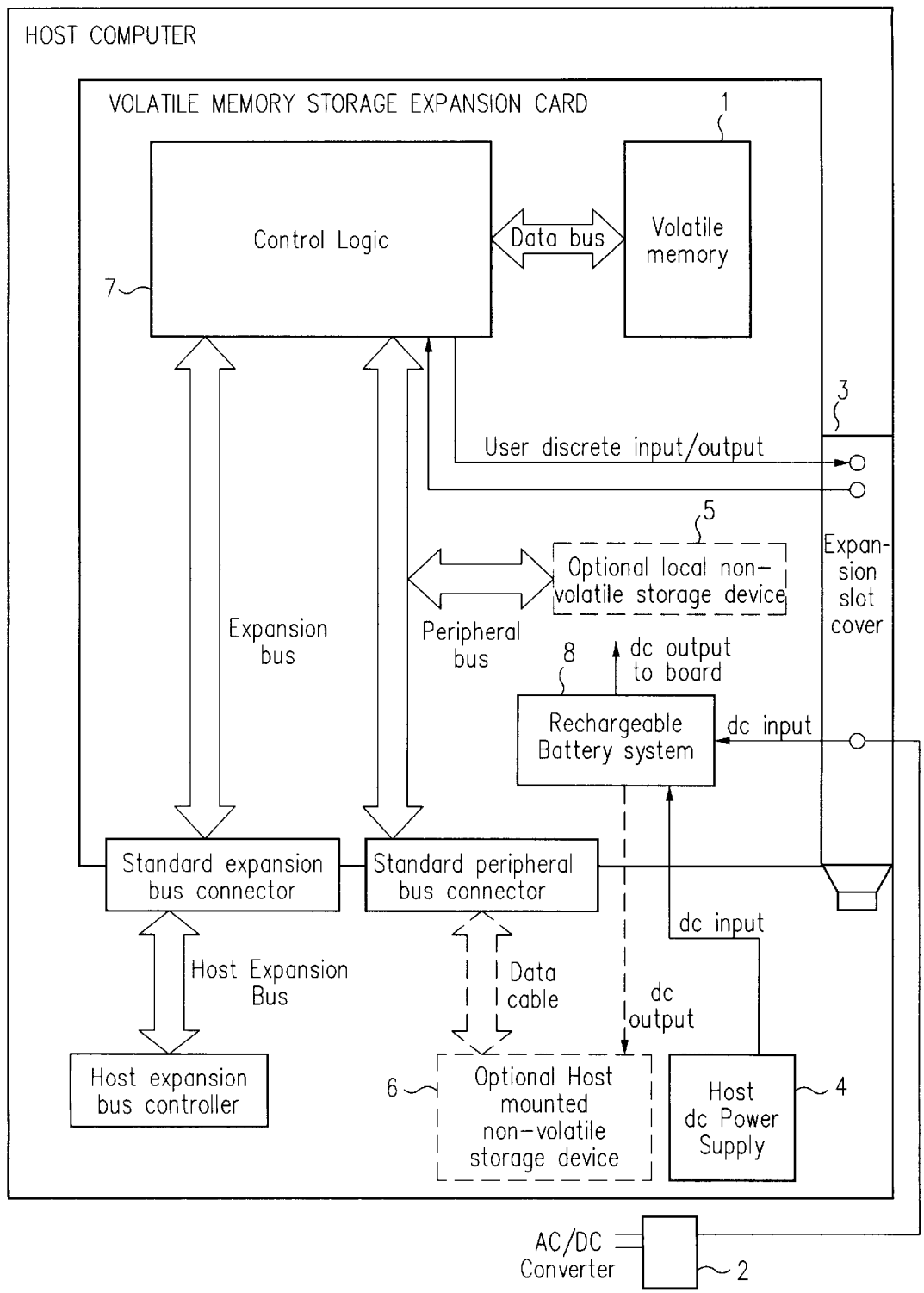
FIG. 1 is a block diagram of a volatile memory storage expansion card internally mounted to the host computer. It shows the power and data paths described in the Claims.

For volatile memory storage expansion cards located in the host computer (FIG. 1), continuous dc power from an AC/DC converter 2 is provided to the rechargeable battery system 8. The rechargeable battery system then provides power to the card, including volatile memory 1, and optionally to the host mounted or local non-volatile storage device 5, 6.

An expansion slot cover 3 contains dc connections and discrete user input/output for status indication and manual backup initiation. In addition, dc power from the host computer 4 is supplied to the rechargeable battery system, providing a second dc power source for the card.

An automatic and/or manual means to back-up and restore the data stored in the volatile memory to a locally 5 or remotely 6 mounted non-volatile storage device is provided in the firmware of the control logic 7.

In the preferred embodiment the volatile memory storage device is used to store data and is provided with continuous power, even when the host computer is off. When the host computer is turned on, the data stored in the volatile memory storage device are normally immediately available.

Data are then read and written to the volatile memory storage device during the normal use of the host computer. At any time, the user may manually initialize a back-up procedure, which then transfers the entire contents of the volatile memory to a non-volatile storage device 5,6. When this process is finished, the data in volatile memory are again available for normal use, and the back-up data are unchanged.

The loss of commercial power will initiate an automatic back-up from the volatile memory to the non-volatile storage device. After the back-up, the non-volatile memory will continue to be available for normal operation (running on host computer supplied dc), while an alarm condition is indicated. The alarm condition will be automatically cleared upon restoration of commercial power.

The loss of host computer dc will initiate an automatic back-up from the volatile memory to the non-volatile storage device. After the back-up, the non-volatile memory will continue to be available for normal operation, with no alarm condition.

Upon the loss of commercial power and host computer supplied dc, power will be provided seamlessly from the rechargeable battery system to the volatile memory and the non-volatile storage device. In addition, an automatic back-up from the volatile memory to the non-volatile storage device will be initiated, an alarm condition will be indicated, and the device will be orderly shut down.

When commercial power or host computer supplied dc is restored to the volatile memory storage expansion card, it will then automatically restore the data previously saved from the non-volatile storage device to the volatile memory. The data will then be available for normal access.

Figure 2:
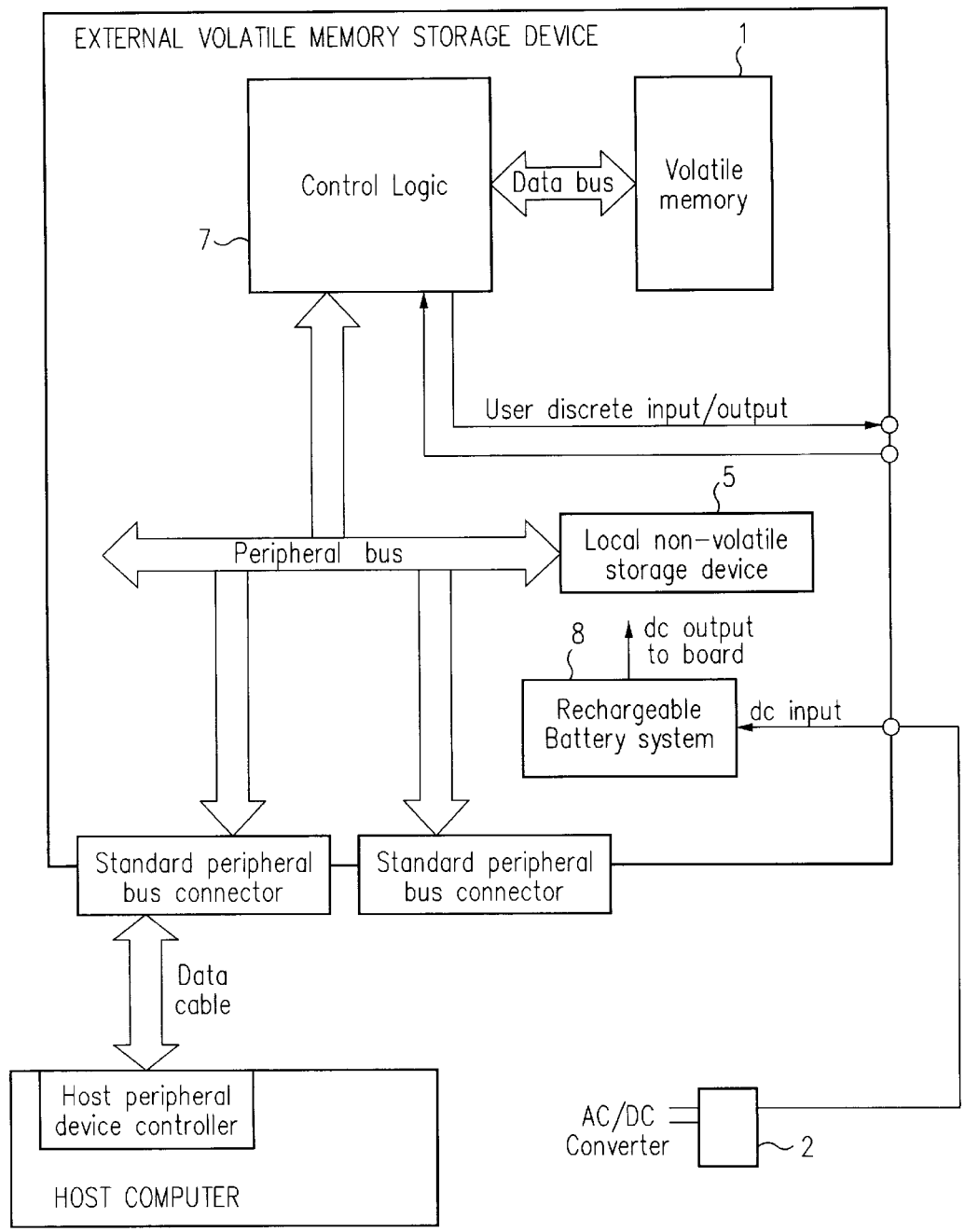
FIG. 2 is a block diagram of a volatile memory storage device external to the host computer. It shows the power and data paths described in the Claims.

For volatile memory storage devices located external to the host computer (FIG. 2), continuous dc power from an AC/DC converter 2 is provided to the rechargeable battery system 8. The rechargeable battery system then provides power to the device, including volatile memory 1, and the local non-volatile storage device 5.

An automatic and/or manual means to back-up and restore the data stored in the volatile memory to a locally mounted non-volatile storage device 5 is provided in the firmware of the control logic 7.

In the preferred embodiment the volatile memory storage device is used to store data and is provided with continuous power, even when the host computer is off. When the host computer is turned on, the data stored in the volatile memory are normally immediately available.

Data are then read and written to the volatile memory storage device during the normal use of the host computer. At any time, the user may manually initiate a back-up procedure, which then transfers the entire contents of the volatile memory to the non-volatile storage device 5. When this process is finished, the data in volatile memory are again available for normal use, and the back-up data are unchanged.

In the event of a loss of commercial power, dc power will be provided seamlessly from the rechargeable battery system to the volatile memory and the non-volatile storage device. In addition, an automatic back-up from the volatile memory to the non-volatile storage device will be initiated, an alarm condition will be indicated, and the device will be orderly shut down (regardless of the condition of the host computer).

When commercial power is restored to the volatile memory storage device, it will then automatically restore the data previously saved from the non-volatile storage device to the volatile memory. The data will then be available for normal access.

What is claimed is:

1. A method of stabilizing data stored in volatile memory comprising of:

means for providing direct dc input to the volatile memory;

means for providing a battery back-up to the volatile memory;

means for providing a battery back-up to a local or remotely mounted non-volatile storage device;

means for providing a high bandwidth data path between the volatile memory, the host computer, and a non-volatile storage device;

means for providing long-term data retention upon power loss, by transferring the data stored in the volatile memory to a non-volatile storage device.

* * * * *